Dec. 12, 1961     D. S. HIRSCH     3,012,554

KITCHEN RANGE OVEN RACK

Filed July 8, 1959

INVENTOR.
DAVID S. HIRSCH
BY
*M. R. Marsh*
ATTORNEY

United States Patent Office 3,012,554
Patented Dec. 12, 1961

3,012,554
KITCHEN RANGE OVEN RACK
David S. Hirsch, New York, N.Y., assignor to Welbilt Corporation, Maspeth, N.Y., a corporation of New York
Filed July 8, 1959, Ser. No. 825,742
3 Claims. (Cl. 126—338)

The present invention relates primarily to racks used in the ovens of domestic kitchen ranges and more particularly to improvements in such racks.

The ovens of most present day domestic cooking ranges are equipped with one or more horizontal racks which may be slid or pulled out toward the front. The racks are usually adjustable to different heights and are guided on relatively small inwardly extending projections on the side walls of the oven which also cooperate to limit the distance a rack may normally be pulled out. The extent to which a rack may be pulled out is usually limited to approximately one-half its depth since the rack in both its extended and normal positions must be self-supporting and maintained in a level condition, and the leverage of a heavy article such as a large roast on the front edge of a rack extended more than approximately half its width would tend to tilt, cramp, and/or flex the rack and prevent it from being readily and easily slid back into the oven or require extensive, complicated and expensive guiding mechanisms.

While the limited slidability of the oven racks facilitates the placing, inspection and removing of articles on the front half of the conventionally arranged racks, access to the rear half is considerably limited and particularly when a rack is near the top of the oven or when more than one rack is used requiring closer spacing in the limited height available.

In view of the above, it is an object of the present invention to provide a rack for a kitchen range oven which includes a central section rotatable in the horizontal plane of the rack to permit a major portion of the rear area of the rack to be readily rotated to the front and extend beyond the front of the oven even though the rack is pulled out only substantially half its depth.

Another object of the present invention is to provide a rack having the above feature that is entirely self-contained and which may be employed in ovens provided with the usual and conventional rack supporting and guiding arrangements.

Still another object of the present invention is to provide an oven rack having a rotatable horizontal center section the upper surface of which is at all times in the same horizontal plane as the remaining upper surface area of the rack and is at all times contained within the horizontal dimensions of the rack.

Still another object of the present invention is to provide a rack for a kitchen range oven having the above features and which requires no complicated or extensive guiding elements for the rotatable section, and which is sufficiently strong and rigid for its intended purpose, easily and cheaply manufactured, and which does not to any appreciable extent detract from the usable height of the oven.

The above and further objects, features and advantages of the invention will be more apparent in the following detailed description of the preferred embodiment thereof, wherein reference is made to the accompanying drawings, in the latter of which:

Figure 1:
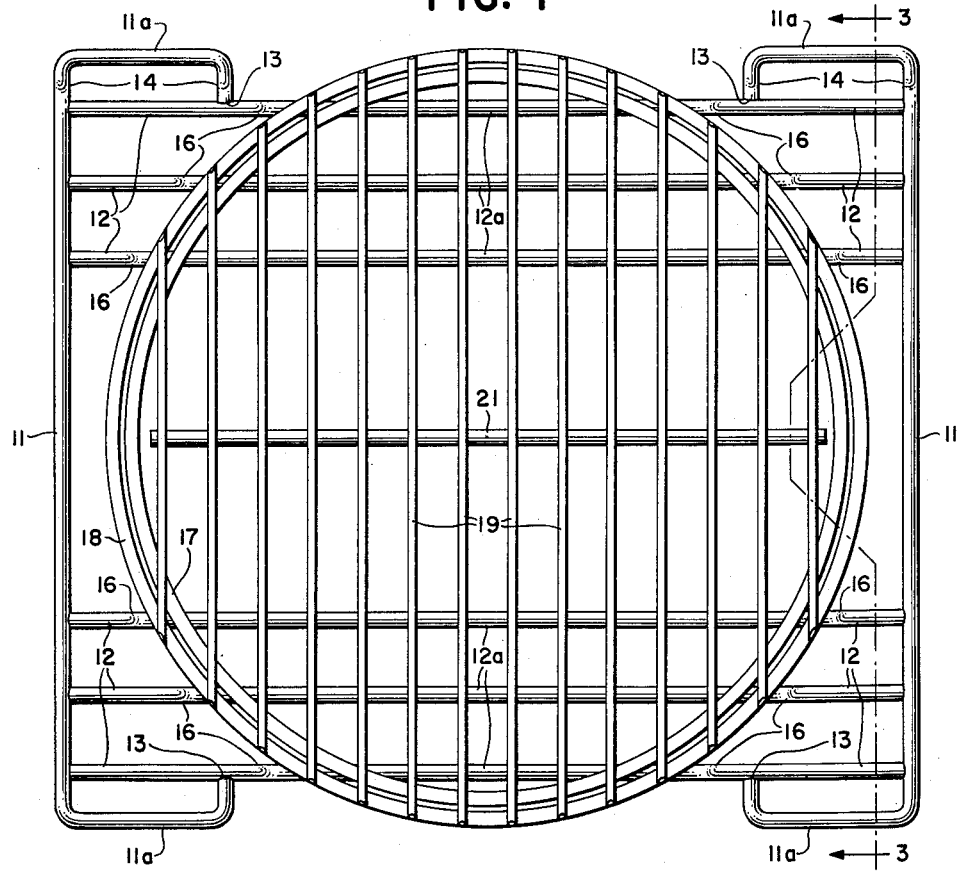
FIG. 1 is a top view of an oven rack constructed in accordance with and embodying the features and principles of the present invention.
Figure 2:
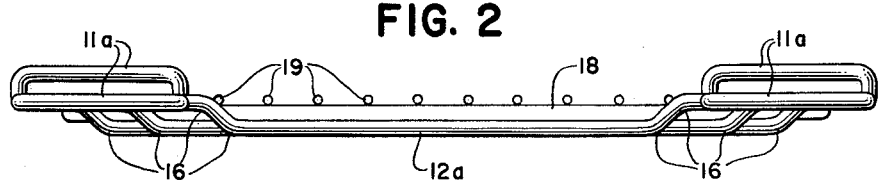
FIG. 2 is a front elevational view of the rack.
Figure 3:
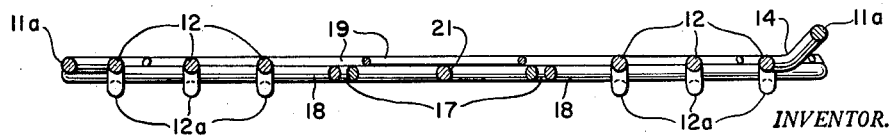
FIG. 3 is a sectional view of the rack taken substantially on line 3—3 of FIG. 1.

Referring now to the drawings, it will be noted that the rack of the present invention is constructed of metal rods of circular cross-section arranged and joined together in the manner hereinafter pointed out in detail. However, it will be apparent that material other than round rods could readily be employed if desired.

The depth and width of the rack correspond to the depth and width of the oven in which it is to be used, and the widths of conventional ovens are usually somewhat greater than the depths, and the drawings accordingly disclose a rack of somewhat greater width than depth. It will be apparent, however, that the invention is not limited to the particular relationship of width and depth illustrated in the drawings and that the principles of the invention can be applied to various dimensioned racks.

The rack includes a pair of opposite side rods 11 adapted to engage and be guided on the usual inwardly extending projections on the oven side walls. Normally the projections are so arranged as to support the rack at different heights and to prevent the front of the rack from tipping downwardly when partially withdrawn from the oven. The side rods 11 are joined together by a plurality of spaced apart transverse rods 12, and in the embodiment shown there are six such rods, three toward the front of the rack and three toward the back. The ends of the transverse rods 12 are joined or secured as by welding, as are all hereinafter mentioned joints, to the inside opposite surfaces of the side rods, and preferably are not larger in diameter than the side rods so as to not interfere with the sliding movement of the rack.

As best shown in FIG. 1, the four end portions 11a of the side rods 11 have double right-angle bends therein with the tips of the ends secured to the side surfaces of the outermost ones of the transverse rods 12 at points such as 13 spaced from the ends of the side rods. This arrangement gives additional strength and rigidity to the rack and also increases the surface area of the rack at the corners. The end portions 11a at the rear of the rack are bent slightly as at 14 so that these portions are slightly above the rack and cooperate with the usual stops in the oven to prevent the rack from normally being withdrawn more than substantially half its depth.

The transverse rods 12 have slightly depressed central sections 12a formed by pairs of reverse bends, such as 16, in the rods. Secured to the upper surfaces of the rods 12 is a centrally located circular ring 17, and the bends 16 are so arranged that the flat depressed sections 12a of the rods 12 extend a slight distance beyond the ring 17.

A second ring 18 slightly larger than the ring 17 and substantially equal in diameter to the front to back dimension of the rack fits loosely around the ring 17 and has a plurality of spaced apart parallel cross-rods 19 secured at their ends to the upper surface of the ring 18. The cross-rods 18 have secured to the under surfaces thereof a reinforcing rod 21 somewhat shorter than the diameter of the ring 17 so that the rod 21 is contained within the plane of the ring 17.

While not essential, the diameters of the side rods 11, the transverse rods 12, the reinforcing rod 21, and the rod material of the rings 17 and 18 are preferably all the same while that of the cross-rods 19 may be somewhat less.

The amount that the transverse rods 12 are depressed is substantially equal to the diameter of the rod material of either ring 17 or ring 18 plus the diameter of the cross-rods 19. Thus the upper surfaces of the cross-rods 19 and those of the undepressed sections of the transverse rods 12 are in substantially the same horizontal plane, giving a flat rack surface over the top of the entire rack.

When the ring 18 is placed over the ring 17, its lower surface rests on the upper surfaces of the depressed sections of the transverse rods 12 while the lower surfaces adjacent the ends of the cross-rods 19 contact the upper surface of the ring 17. Thus with some clearance between the rings 17 and 18, the loose ring 18 with its cross-rods 19 can be readily rotated in the plane of the rack. Accordingly, with the rack partly withdrawn from the oven, the loose ring 18 can be rotated to bring the inner part thereof to the front where articles can be much more conveniently placed on or removed and/or inspected than when wholly or partly contained within the oven.

It will be noted that with a rack of the proportions shown the greater part of the area of the grate can be readily available even though the rack is only partly withdrawn, or with the rack wholly in the oven the ring 18 can be rotated to bring articles in the rear of the oven to the front.

It will be obvious that the principles of the present invention are not limited to the details shown and described herein, and it is desired therefore that only such limitations be placed thereon as are specifically set forth in the appended claims.

What is claimed is:

1. A rack for an oven having a pair of opposite side elements adapted to engage projections extending inwardly from the sides of the oven to permit sliding movement of said rack with respect to said oven, a plurality of transversely extending rod members secured at their ends to said side elements, said rod members having downwardly offset parallel central sections, a first circular ring of circular cross-section material secured to the upper surfaces of the downwardly offset sections of said rod members, a second circular ring of circular cross-section rod material adapted to fit loosely about said first ring and substantially equal in diameter to the front to back dimension of said rack, said second ring having a plurality of parallel spaced apart cross rods secured at their ends to the upper surface of said second ring and adapted to rest adjacent their ends on the upper surface of said first ring with the lower surface of said second ring resting upon the upper surfaces of said transverse rods, said second ring being adapted to rotate about said first ring with the under-surfaces of said cross rods thereof sliding on the upper surface of said first ring and the lower surface of said second ring sliding on the upper surface of the offset sections of said transversely extending elements, said first ring during such rotation of said second ring being engageable with said second ring to limit the lateral movement thereof.

2. A rack as set forth in claim 1, wherein the ends of said transverse rod members are secured to the inside opposite surfaces of said side elements and the offset central sections supporting said first circular ring are offset downwardly an amount substantially equal to the sum of the diameter of the rod material of said first ring and that of the cross rods of said second ring whereby the upper surfaces at the ends of said transverse rods and the upper surfaces of the cross rods of said second ring are in a substantially common plane.

3. An oven rack as set forth in claim 1 wherein the transverse rods extending between said side rods and secured at their ends to the inside opposite surfaces of said side rods and the end portions of said side rods have reverse bends therein with the tip ends thereof spaced inwardly from the central sections of the side rods and secured to the outer surfaces of the two outermost ones of said transverse rods.

References Cited in the file of this patent

UNITED STATES PATENTS

| | | |
|---|---|---|
| 1,332,251 | Gatchell | Mar. 2, 1920 |
| 1,335,844 | Lightle | Apr. 6, 1920 |
| 1,350,330 | Partonnar | Aug. 24, 1920 |
| 1,380,078 | Partonnar | May 31, 1921 |
| 1,530,226 | Bitney | Mar. 17, 1925 |
| 1,660,200 | Kummermehr et al. | Feb. 21, 1928 |